Figure 1:
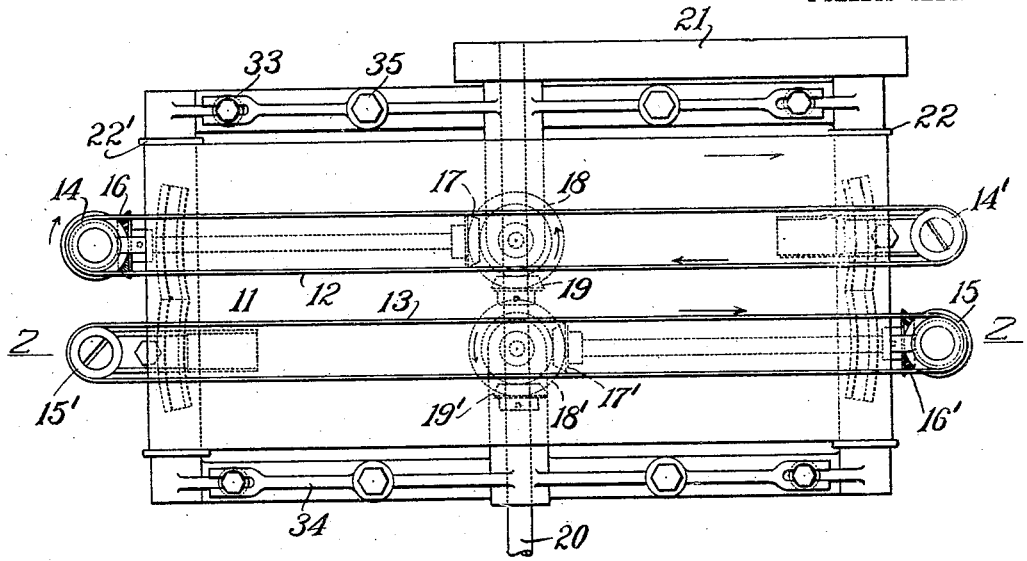

G. H. PETRI.
FORMING MACHINE FOR DOUGH.
APPLICATION FILED JUNE 29, 1908.

941,338.

Patented Nov. 23, 1909.
2 SHEETS—SHEET 1.

WITNESSES

INVENTOR
GUNTHER H. PETRI
BY HIS ATTORNEYS
Mitchell Chadwick & Kent

G. H. PETRI.
FORMING MACHINE FOR DOUGH.
APPLICATION FILED JUNE 29, 1908.

941,338.

Patented Nov. 23, 1909.
2 SHEETS—SHEET 2.

WITNESSES
Annie B. Lindsay
Agnes G. Colgan

INVENTOR
GUNTHER H. PETRI
BY HIS ATTORNEYS
Mitchell Chadwick & Kent

UNITED STATES PATENT OFFICE.

GUNTHER H. PETRI, OF BOSTON, MASSACHUSETTS.

FORMING-MACHINE FOR DOUGH.

941,338.   Specification of Letters Patent.   Patented Nov. 23, 1909.

Application filed June 29, 1908.   Serial No. 440,821.

*To all whom it may concern:*

Be it known that I, GUNTHER H. PETRI, citizen of the United States, residing at Boston, in the county of Suffolk and State of Massachusetts, have invented new and useful Improvements in Forming-Machines for Dough, of which the following is a specification.

This invention relates to forming machines for dough and other plastic materials.

More particularly it relates to machines for molding dough, forming a skin thereon and a shape suitable for rolls, loaves of bread, etc.

The object is to improve and simplify apparatus of this sort by eliminating troughs, reciprocating compressors and other features which have characterized apparatus heretofore known and which have had the effect of increasing the cost and complication of apparatus, of concealing the dough from observation while undergoing the process and rendering it not easily accessible for treatment with flour, etc., and which are not easily adjustable to meet the needs of differing sizes of loaves or consistency and quality of dough.

The invention is an improvement upon machines of this type shown and claimed in my co-pending applications for patent Serial Nos. 431369 and 431370.

In the present improvement these objects are accomplished by apparatus which has a carrier for dough, preferably a moving belt with a flat horizontal working surface, along which run two belts, approximately parallel to each other and to the carrier, arranged with their working surfaces upright, facing each other, and moving in opposite directions close above the carrier. The dough is manipulated by the joint action of these three belts. The two upright belts moving in opposite directions tend to give it rotation about a vertical axis. The carrier belt, coöperating with them, tends to give it rotation about a horizontal axis. The resultant rotation of the mass forms the dough into a ball. Precise parallelism of the upright surfaced belts to each other may be departed from to the extent of making a choking throat for greater lateral compression of the dough, or the reverse for relieving the lateral compression of the dough. The general direction of these parallel belts may be that of the carrier belt or may be at an angle thereto, with a varying effect upon the dough which is being molded; and means is provided to adjust this angle at pleasure.

Figure 2:
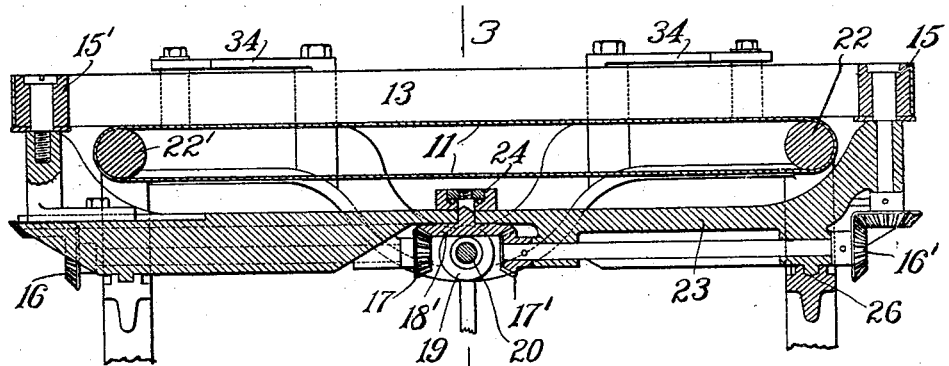
Figure 3:
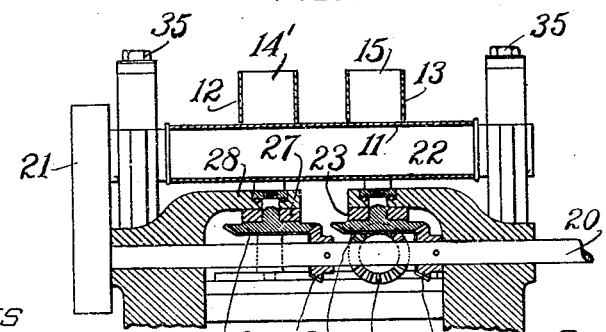
Figure 4:
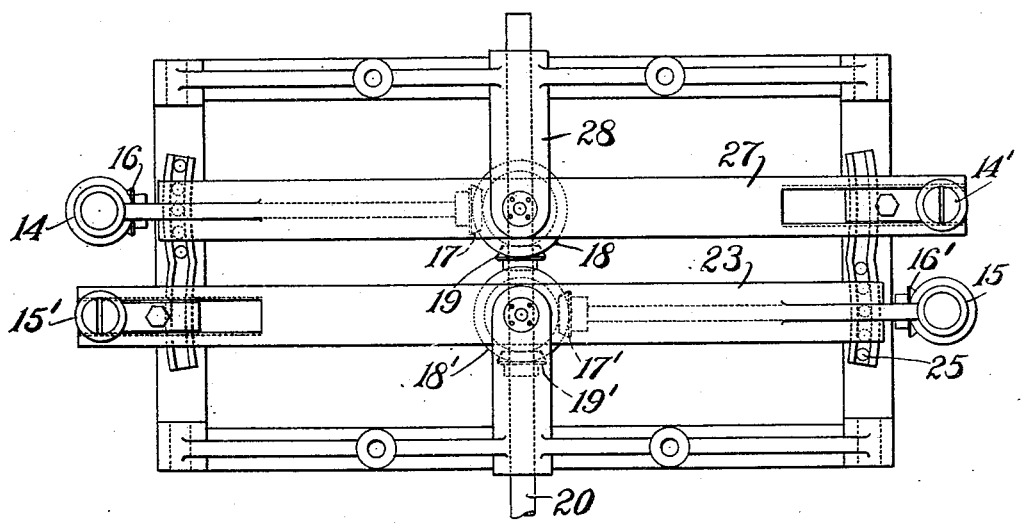
Figure 5:
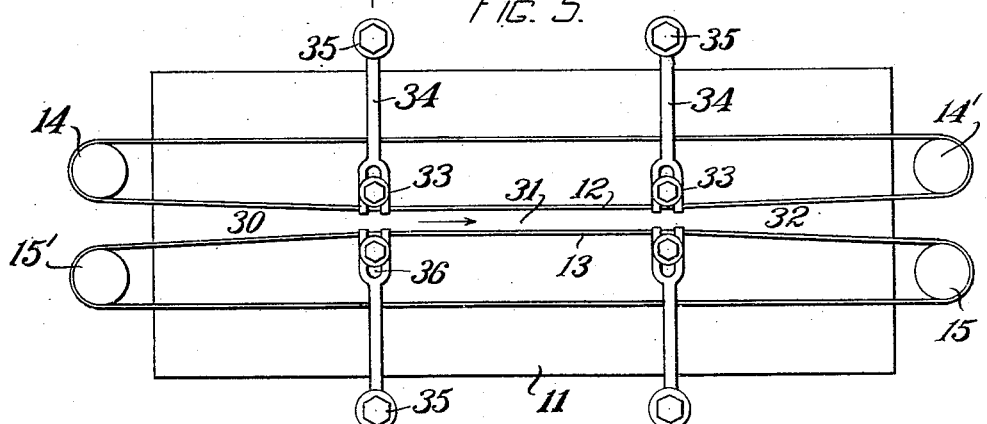
Figure 6:
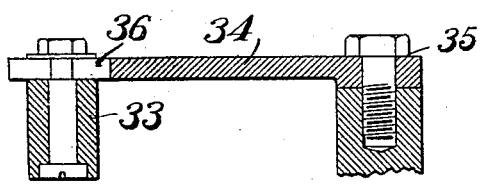

Apparatus embodying the invention is illustrated in accompanying drawings, in which, Figure 1 is a plan of apparatus embodying the invention; Fig. 2 is a vertical elevation of the same in section on the line 2—2 of Fig. 1; Fig. 3 is an end elevation in section on the line 3—3 of Fig. 2; Fig. 4 is a plan of the apparatus illustrated in Fig. 1, with some of the parts removed, showing the frame and driving mechanism; Fig. 5 is a diagrammatic representation, in plan, showing the operation of certain parts; and Fig. 6 is a sectional elevation on the line 6—6 of Fig. 5 showing a detail enlarged.

Referring to the drawings, 11 represents a horizontal carrier belt passing around rollers 22, 22', and adapted to receive and support a succession of masses of dough which are to be formed and rounded. This constitutes a horizontal molding surface. It is driven by a driving belt 21 from a pulley on shaft 20. 12 and 13 are belts which constitute upright molding surfaces. They travel around guide pulleys 14, 14' and 15, 15' respectively, which have vertical axes, and are set so that belts 12 and 13 travel with the edges of their working faces close above the carrier pulley 11, moving in opposite directions, as indicated by the arrows. The belt 12 is driven by pulley 14 which in turn is driven by the train of gearing underneath marked respectively 16, 17, 18, and 19, the latter gear being on shaft 20, which may be the main driving shaft. Pulley 15 is similarly driven through a separate train of gearing 16', 17', 18', and 19'. The working surface of one of these travels in the same general direction as the working surface of belt 11. Relative speed of the various belts may vary according to the rotative and molding effect desired. In the drawings belts 12 and 13 are represented as having the same speed in opposite directions. Hence a mass of dough between them, acted upon by both, would tend to rotate about a stationary vertical axis. Belt 11 is represented as moving more slowly than 12 and 13. As the middle of the mass is restrained by the joint effect of belts 12 and 13, and the top part is free and unrestrained, the tendency of belt 11 to carry the dough forward is resisted more or less and somewhat of a rolling motion is imparted to the mass about its horizontal axis, according to the speed of the various belts and the amount of friction or slip between each and the dough.

It is contemplated that the belts 12 and 13 will run at an angle to the direction of belt 11. Provision is made for this by pivoted supports 23, 28, for the belts 12 and 13. Pulleys 15, 15' of belt 13 are mounted on the arm 23 (Fig. 2) the center of which is pivotally mounted at 24 on ball bearings on the frame of the machine. The gear 18' is on the same axis. The train of gearing 16', 17' being on arm 23, gear 17' always meshes with gear 18' whatever position the arm 23 may occupy upon its pivot. It is contemplated that the adjustment of the arm about the central pivot shall be relatively small, as indicated by the arcs 25 of Fig. 4, which form auxiliary guide-ways to hold the arm steady, and which contain a series of depressions into which points 26 may fit to hold the arm in whatever position it is placed by adjustment. The pivotal bearing 24 is supported by projections 27 from the side bars of the frame of the machine. In use it is contemplated that the arm 23 holding belt 13 and its corresponding arm 28 holding the belt 12 will be adjusted to positions at an angle to the position shown in Figs. 1 and 4 the two belts still being parallel to each other. The forward belt will then act as an angular barrier to progress of dough on the carrier and will roll the mass of dough somewhat sidewise upon the carrier belt with an additional molding effect, this being an element additional to those above mentioned.

Still another element may be introduced into the molding action by providing means for successive lateral compression and relaxation of pressure upon the mass of dough between belts 12 and 13. One embodiment of this is illustrated diagrammatically in Fig. 5 where the working portions of belts 12 and 13 are forced toward each other making a contracting throat into which the dough mass is carried at 30, a parallel sided contracted portion at 31, and an expanding throat portion at 32 where the lateral pressure on the dough is removed entirely or is somewhat relieved. This is accomplished by means of guide pulleys 33 mounted on arms 34 fastened on the frame of the machine by bolts 35 about which they may be adjusted to the position shown in Fig. 5, or to the position shown in Fig. 1 where they are represented swung to the side of the machine and out of action, or to any intermediate position. The pulleys 33 may be adjusted in slots 36 on said arms 34.

The foregoing description shows the construction of a machine embodying the principles of the invention, but it will be understood that in use various changes will naturally be made from the specific proportions and arrangements according to the needs of the work in hand. For example, while the belt 11 is called a carrier belt its function would perhaps be more aptly described by calling it merely a support. The mass rests upon it, and during the forming process either remains in substantially the same position or rolls in one direction or the other according to the speed of the various belts relative to each other. Any diversity between the speed of the belts 12 and 13 will tend to roll the mass in the direction of the belt having the faster speed. The total rotative effect depends upon the diversity of speed, whether such diversity be found by subtracting the speed of one belt from that of another going in the same direction or by adding the speed of belts going in opposite directions. Belt 12 may be considered in the mathematical sense of traveling in the same direction as belt 13 with a negative speed. The rounding or forming effect of the belts may be varied by changing their speeds relative to each other; and by this means also a gradual progression of the mass from one end of the machine to the other may be effected. If the molding surface 13, for example, goes faster to the right than the molding surface 12 goes to the left, the mass engaged between them will roll to the right. The speed of either belt 12 or 13 may be changed by changing the gearing at 16 or 16'; and of course any different method of propulsion or any other means of changing the speed may be substituted. Where the molding surfaces acting on opposite sides of the mass are to move at the same speed in opposite directions one of the two belts, 12 or 13 may be omitted, and the mass of dough may be placed on carrier belt 11 between the two parallel oppositely moving portions of the remaining belt. In such case the inner faces of the belt are the molding surfaces. The width between these two faces may be adjusted, if desired, by the means indicated at 34 and 35, in the same manner as in Fig. 5 where the working faces of belts 12 and 13, although proceeding in an approximately parallel direction, yet have portions set at a slight angle from precise parallelism. By using both sides of a belt as molding surfaces, it is possible in apparatus like Fig. 1 to have dough at the same time, between the two limbs of belt 12, between the two limbs of belt 13 and, as first above proposed, between belts 12 and 13.

I claim:—

1. Apparatus of the class described, comprising the combination of elements having three coöperating molding surfaces, one forming a support for material and the other two engaging the material on opposite sides and moving diversely.

2. Apparatus of the class described, comprising the combination of elements having three coöperating molding surfaces, two being approximately parallel and the third forming an intervening moving support for material, the two moving diversely and engaging such material.

3. Apparatus of the class described, comprising the combination of elements having three coöperating molding surfaces, one forming a moving support for material, and the other two engaging opposite sides of material thereon; there being means to move all three at diverse speeds.

4. Apparatus of the class described, comprising a combination of elements, having three diversely moving molding surfaces, each adapted to engage and draw the surface of a mass of material lying between them, all being adapted to act thereon simultaneously, and one of them being also a carrying surface.

5. Apparatus of the class described, comprising a combination of elements having three diversely moving molding surfaces, adapted to engage simultaneously a mass of material between them, one of them being adapted to support the material during the operation.

6. Apparatus of the class described, comprising the combination of flexible bands and guides therefor and means to move the bands diversely, said bands being arranged to engage simultaneously three sides of a mass of material between them.

7. Apparatus of the class described, comprising two oppositely moving elements arranged in a direction approximately parallel to each other, with one or more portions at a slight angle from precise parallelism, and adapted to engage opposite sides of the mass of material between them, in combination with a third element and means to move it in a diverse manner, engaging a third side of such mass.

8. Apparatus of the class described, comprising a flexible belt and guide pulleys therefor with horizontal axes, two flexible belts and guide pulleys therefor with vertical axes, said three belts having molding surfaces arranged to form a support and side barriers for a mass of material; and means to move diversely the portions of said belts which form the molding surfaces.

9. Apparatus of the class described, comprising an endless belt and guide pulleys therefor, having horizontal axes, a second endless belt and guide pulleys therefor, having vertical axes; the second being arranged edgewise against the surface of the first; means to hold the second belt approximately parallel to the surface of the first and at an angle to the direction of motion of said surface; and means to move said belts about their pulleys.

10. In apparatus of the class described, the combination of an element having a molding surface forming a support for material; elements having two diversely moving molding surfaces set edgewise toward said supporting surface approximately parallel to each other; means to adjust the distances apart of said second elements and means to move said second elements diversely in said positions.

Signed by me at Boston this twentieth day of June 1908.

GUNTHER H. PETRI.

Witnesses:
JOSEPH T. BRENNAN,
EVERETT E. KENT.